United States Patent [19]

Asato et al.

[11] Patent Number: 5,030,681
[45] Date of Patent: Jul. 9, 1991

[54] COATING RESIN COMPOSITION

[75] Inventors: Ikuo Asato, Hirakata; Toshikazu Nagatani, Osaka; Akira Inoue, Kobe; Isao Fukuyama, Hyogo, all of Japan

[73] Assignees: Nippon Bee Chemical Co., Ltd.; Saka Chemical Industrial Company, Ltd., both of Japan

[21] Appl. No.: 339,857

[22] Filed: Apr. 14, 1989

Related U.S. Application Data

[63] Continuation of Ser. No. 246,901, Sep. 16, 1988, abandoned, which is a continuation of Ser. No. 878,841, filed as PCT JP86/00220 on Apr. 30, 1986, published as WO87/06600 on Nov. 5, 1987, abandoned.

[51] Int. Cl.$^5$ ................... C09L 4/06; C09L 175/04; C08L 75/04
[52] U.S. Cl. .................... 524/504; 524/507; 525/66; 525/125
[58] Field of Search .............. 525/66; 524/507, 504

[56] References Cited

FOREIGN PATENT DOCUMENTS 5373230 3/1982 Japan.
58-17174 2/1983 Japan.
58-76207 10/1983 Japan.
0140269 8/1984 Japan ..................... 525/66

*Primary Examiner*—Ana L. Carrillo
*Attorney, Agent, or Firm*—Wayne E. Nacker; Gerald K. White

[57] ABSTRACT

Disclosed is a coating resin composition obtained by graft-polymerizing an unsaturated carboxylic acid to a chlorinated polyolefin in a solvent, esterifying all unsaturated carboxylic acid present in the reaction system, and mixing the obtained composition with a urethane prepolymer so that the weight ratio of the solids of the composition to the solids of the urethane prepolymer is in the range of from 90/10 to 10/90. This composition has a greatly improved gasoline resistance, smell generation is controlled and the storage stability at low temperature is high. The composition is effective as a general-purpose primer showing a high adhesion to inorganic materials, polar resins, non-polar resins, metals, and other materials.

12 Claims, No Drawings

COATING RESIN COMPOSITION

This is a continuation of application Ser. No. 246,901 filed on Sept. 16, 1988, now abandoned, which is a continuation of Ser. No. 878,841 filed as PCT JP 86/00220 on Apr. 30, 1986, published as WO 87/06600 on Nov. 5, 1987, (now abandoned).

TECHNICAL FIELD

The present invention relates to a modified chlorinated polyolefin type coating resin composition. More particularly, the present invention relates to a novel valuable coating composition which can be applied as a primer to a variety of materials, and a process for the preparation of this coating composition.

BACKGROUND ART

Various resin paints have been developed and utilized as surface coating materials for motor vehicles and the like. However, these paints have merits and demerits and have poor general-purpose properties. Recently, however, a modified chlorinated polyolefin paint has been developed and utilized as a lacquer having excellent solvent resistance and general-purpose properties. As typical instances of the prior art, there can be mentioned Japanese Unexamined Patent Publication No. 58-176207 and Japanese Unexamined Patent Publication No. 60-1214. The latter Japanese Unexamined Patent Publication No. 60-1214 teaches that, in order to overcome defects of a chlorinated polyethylene paint and still retain excellent weatherability, chemical resistance, flame resistance, resistance against thermal aging, flexibility, sanitary characteristics, and electric characteristics, a modified chlorinated polyethylene formed by graft-polymerizing an unsaturated carboxylic acid or an anhydride thereof to chlorinated polyethylene is used. Chlorinated polyethylene per se has poor adhesion to metals and alloys such as iron, aluminum and steel, polar polymers and inorganic materials, such as mica and glass, but a modified chlorinated polyethylene formed by graft-polymerizing an unsaturated carboxylic acid to chlorinated polyethylene, has adhesion to these materials.

However, this modified chlorinated polyolefin paint is defective in that the storage stability of the lacquer is poor because the graft polymer is crystallized at low temperatures.

In this lacquer, the unsaturated carboxylic acid or its anhydride is left unreacted at the reaction step.

In practice, it is difficult to completely remove the residual unsaturated carboxylic acid or anhydride from the paint. The unreacted unsaturated carboxylic acid produces a smell at the coating operation, and this problem of smell generation is considered to be significant when carrying out the coating operation. The invention disclosed in the above-mentioned Japanese Unexamined Patent Publication No. 60-1214 relates to a reaction process in which any remaining unreacted unsaturated carboxylic acid is controlled as much as possible. Nevertheless, even if this process is adopted, it is impossible to completely remove the odiferous unreacted unsaturated carboxylic acid from the coating composition.

Apart from this problem of odor, an improvement of the poor storage stability owing to crystallization of the graft polymer at low temperatures is not attained by either this prior invention or the invention of the above-mentioned Japanese Unexamined Patent Publication No. 58-176207.

Moreover, the coating compositions of these prior art techniques still have an unsatisfactory gasoline resistance, which is especially important for a primer for motor vehicles.

DISCLOSURE OF THE INVENTION

It is an object of the present invention to provide a coating composition in which the gasoline resistance is greatly improved; the problem of odor, which is not completely solved by the above-mentioned prior art techniques, is overcome; and the problem of poor storage stability, which remains unsolved, is solved. The general-purpose properties of the compositions are very good, while the advantages of modified chlorinated polyolefin type paints are retained. The invention also provides a process for the preparation of this coating composition.

In accordance with the present invention, there is provided a coating resin composition comprising a graft polymer of a chlorinated polyolefin and an esterified unsaturated carboxylic acid or an anhydride thereof, an esterification product of an ungrafted unsaturated carboxylic acid and a monohydric or polyhydric alcohol, and a urethane prepolymer which is a reaction product of a polyol and an isocyanate monomer or a derivative thereof.

Furthermore, in accordance with the present invention, there is provided a process for the preparation of a coating resin composition, which comprises reacting 100 parts of a chlorinated polyolefin with 1 to 20% by weight of an unsaturated carboxylic acid or an anhydride thereof in a reaction solvent so that the proportion of the non-volatile portion in the reaction system is adjusted to 10 to 50% by weight, mixing 100 parts of the obtained unsaturated carboxylic acid-grafted chlorinated polyolefin with a monohydric or polyhydric alcohol in an amount of 0.5 to 2 equivalents to the carboxyl groups of the unsaturated carboxylic acid to esterify the grafted unsaturated carboxylic acid and the ungrafted unsaturated carboxylic acid in the grafting reaction system, separately forming a urethane prepolymer by reaction of a polyol with an isocyanate, and mixing the composition of the grafting and esterification reaction system with the composition of the prepolymer-forming reaction system, so that the weight ratio of the solids of the grafting and esterification reaction system to the solids of the prepolymer-forming reaction system is in the range of from 90/10 to 10/90.

The first characteristic feature of the present invention resides in that, after an unsaturated carboxylic acid is graft-polymerized to a chlorinated polyolefin, esterification is carried out with an alcohol. By this esterification, not only the grafted unsaturated carboxylic acid, but also the unsaturated carboxylic acid left unreacted at the grafting step, is esterified. Accordingly, the volatilization temperature of the unsaturated carboxylic acid is elevated, and hence, the problem of odor is overcome.

The second characteristic feature of the present invention resides in that, by the above-mentioned esterification, there is unexpectedly attained an improvement of the compatibility of the modified chlorinated polyolefin coating composition and, a known urethane prepolymer composition. The esterification product can be effectively mixed with the modified chlorinated polyolefin coating composition. This mixture can be used as a primer for a polyolefin material, such as that disclosed in Japanese Unexamined Patent Publication No.

60-186538. As a result of the mixing, the crystallization temperature of the modified chlorinated polyolefin resin is lowered; and hence, the storage stability of this resin at low temperatures is improved, while the excellent characteristics of this resin is retained. Although the storage of conventional paints in winter requires a warm storehouse, the coating composition of the present invention does not.

The gasoline resistance is prominently improved by the synergistic effect of the esterified modified chlorinated polyolefin resin with the urethane prepolymer. Furthermore, both components fully adhere to various materials. Thus, it is confirmed that the coating composition of the present invention shows an excellent adhesion not only to polyolefin materials but also to non-polar resins; polar resins, such as polyamides, polybutylene terephthalate, polyethylene terephthalate, polyphenylene oxide, reaction injection molding (typically representing urethane resin), sheet molding compound (of unsaturated polyester resin), bulk molding compound (of unsaturated polyester resin), fiber reinforced plastic and acrylonitrile-butadiene-styrene; metals such as iron, aluminum, copper, lead, zinc, tin and nickel; alloys such as stainless steel and brass; and other inorganic substances.

Preferably, the chlorination degree of the chlorinated polyolefin used in the present invention is 10 to 50% more preferably 20 to 40%.

As typical examples of the polyolefin, there can be mentioned homopolymers and copolymers of ethylene, propylene, 1-butene and 3-methyl-1-butene. The carbon number of the unsaturated carboxylic acid is 15 at most. In view of the effect of improving the gasoline resistance, a dibasic acid or an anhydride thereof is preferred as the unsaturated carboxylic acid. The amount of the unsaturated carboxylic acid is 1 to 20% by weight, preferably 5 to 15% by weight, based on the weight of the chlorinated polyolefin. If the amount of the unsaturated carboxylic acid is smaller than 1% by weight, the solvent resistance is insufficient. If the amount of the unsaturated carboxylic acid exceeds 20% by weight, the adhesion to a polyolefin material is degraded, becoming gelatious.

As the alcohol for the esterification includes monohydric alcohols, such as methanol and ethanol; and polyhydric alcohols, such as ethylene glycol and glycerol. These alcohols may be used singly or in the form of mixtures of two or more thereof.

As the polyol for formation of the urethane prepolymer, there may be used polyols having at least two OH groups in the molecule, such as polyethylene glycol, polytetramethylene glycol, and OH group-containing isoprene.

As the isocyanate, there may be used isocyanate monomers and derivatives, such as hexamethylene diisocyanate (HMDI), tolylene diisocyanate (TDI), and diphenylmethane diisocyanate (MDI). Preferably, the polyol and isocyanate are incorporated in amounts such that the molar ratio of the OH groups to the NCO groups is in the range of from 10/1 to 10/7.

The unsaturated carboxylic acid-grafted chlorinated polyolefin should be mixed with the urethane prepolymer so that the weight ratio of the solids of the composition of the esterified graft polymer and esterification product to the solids of the urethane prepolymer composition is in the range of from 10/90 to 90/10, preferably from 60/40 to 90/10. If this mixing ratio is in the range of from 10/90 to 60/40, the adhesion to a polyolefin material is relatively low.

Preferably, the grafting reaction is carried out by using a radical polymerization initiator in which the half-value period at 100° C. is 0.1 to 20 hours. An organic peroxide in which the half-value period at 100° C. is 0.2 to 10 hours is particularly preferred as the initiator. Suitable initiators include, for example benzoyl peroxide (B.P.O.), dilauryl peroxide, and diacetyl peroxide.

In order to shorten the reaction time and reduce the manufacturing cost, it is preferred to use an amine, such as triethylamine, or an organic tin compound, such as dibutyltin dilaurate, as a urethanation catalyst for the urethane prepolymer-forming reaction.

The resin composition of the present invention obtained under the above-mentioned conditions has the following excellent characteristics as a paint, especially as a primer:

1. The solvent resistance is good;
2. A high gasoline resistance is attained;
3. The storage stability at low temperatures is good;
4. Smell generation is controlled;
5. Good adhesion is achieved to not only polyolefin materials but also to metals and polar group-containing plastic materials;
6. The steps for synthesizing the resin are very simple (vacuum removal of the residual monomer is not necessary); and
7. All pigments may be used as in case of ordinary coloring paints, plus coloration of the resin composition is possible.

BEST MODE FOR CARRYING OUT THE INVENTION

Samples used for Examples 1 through 7 according to the present invention and Comparative Examples 1 through 3 were prepared according to the following processes.

Production Examples A through E are examples illustrating the production of unsaturated carboxylic acid-grafted chlorinated polyolefin composition samples by the grafting reaction or by the grafting and esterification reaction.

Production Example A

A 4-neck 1000 ml flask equipped with a stirring rod, a thermometer and a cooling condenser, was charged with 210 g of xylene and 90 g of chlorinated polypropylene having a chlorination degree of 29%. The mixture was heated with stirring. When the temperature reached 80° C., 5.4 g of maleic anhydride was added and uniformly dissolved. Then, 0.3 g of B.P.O. was added, and the mixture was maintained at 85° to 90° C. for 3 hours. Then, 0.3 g of B.P.O. was further added, and the mixture was maintained at the same temperature for 3 hours. The temperature was then lowered to 80° C., and 350 g of toluene and 7 g of ethyl alcohol were added. The mixture was maintained at 80° to 85° C. for 5 hours to complete the reaction.

In Production Examples B, C, D and E, synthesis was carried out in the same manner as described above in Production Example A. The components used in these Production Examples are shown in Table I.

TABLE I

|  | Production Example A | Production Example B | Production Example C | Production Example D | Production Example E |
|---|---|---|---|---|---|
| Chlorinated polypropylene | 13.6 | 16.1 | 17.3 | 11.2 | 16.1 |
| (Chlorination degree) | (29%) | (24%) | (48%) | (17%) | (24%) |
| Maleic anhydride | 0.81 | 1.61 | 2.60 |  | 16.1 |
| Methacrylic acid |  |  |  | 1.12 |  |
| B.P.O. | 0.09 | 0.16 | 0.26 | 0.11 | 0.16 |
| Ethanol | 1.10 |  | 1.74 |  |  |
| Ethylene glycol |  | 1.13 |  |  |  |
| Xylene | 31.7 | 47.5 | 43.4 | 47.8 | 47.5 |
| Toluene | 52.7 | 33.5 | 34.7 | 39.8 | 33.5 |
| Total | 100.0 | 100.0 | 100.0 | 100.03 | 98.87 |

Production Example F through H are examples illustrating the production of urethane prepolymer composition samples. These samples were prepared according to the following procedures.

Production Example F

A 4-neck 1000 ml flask equipped with a stirring rod, a thermometer and a cooling condenser, was charged with 263 g of toluene and 80.7 g of liquid polyisoprene having at least two OH groups in the molecule. The mixture was heated with stirring. When, the temperature reached 80° C., 6.1 g of 4,4'-diphenylmethane diisocyanate plus 0.3 g of a 10% toluene solution of dibutyltin dilaurate were added. The temperature was then elevated to 90° C., and this temperature was maintained for 4 hours to complete the reaction. In Production Examples G and H, synthesis was carried out in the same manner as described above in Production Example F. The components used in these Production Examples are shown in Table II.

TABLE II

|  | Production Example F | Production Example G | Production Example H |
|---|---|---|---|
| OH-containing polyisoprene | 23.1 | 34.7 |  |
| PTMG 1000 |  |  | 12.3 |
| MDI | 1.74 | 1.74 | 0.86 |
| 10% Toluene solution of dibutyltin dilaurate | 0.09 | 0.09 | 0.04 |
| Toluene | 75.1 | 40.4 | 86.8 |
| Total | 100.03 | 100.03 | 100.0 |
| OH/NCO | 10/5 | 10/3.3 | 10/2.5 |

The above-mentioned samples (Production Examples A through H) were mixed at predetermined ratios shown in Table III, and the mixtures were blended at room temperature for about 10 to about 30 minutes by using an ordinary stirrer such as a disperser to form a homogeneous composition.

Test plates were prepared according to the following procedures.
1. Substrate: substrate used in the example
2. Pretreatment: degreasing and wiping with IPA
3. Primer: the above composition
4. Coating method: air-spray coating
5. Coating thickness: 15 μm
6. Setting: 15 minutes (room temperature)
7. Top-coating:
    1) Two-pack urethane paint: R-263 (supplied by Nippon Bee Chemical)
    2) Coating method: air-spray coating method
    3) Coating thickness: 35 μm
    4) Baking conditions: 90° C.×30 minutes The test plates obtained in Examples 1 through 7 and Comparative Examples 1 through 3 were tested according to specific methods. The conditions and results are summarized in Table III. In table III, mark "o" indicates that the plate passed the test, mark "x" indicates that the plate did not pass the test, and mark "Δ" indicates that the plate narrowly passed the test.

Additional tests were carried out in the same manner as in the Example and Comparative Examples except that a one-pack melamine baking type paint was used as the top-coating paint. The obtained results were substantially the same as those shown in Table III.

TABLE III

|  |  | Example 1 | Example 2 | Example 3 | Example 4 | Example 5 | Example 6 | Example 7 | Comparative Example 1 |
|---|---|---|---|---|---|---|---|---|---|
| Production Example A |  | 100 |  | 100 |  |  |  | 100 | 100 |
| Production Example B |  |  | 100 |  |  |  |  |  |  |
| Production Example C |  |  |  |  | 100 |  |  |  |  |
| Production Example D |  |  |  |  |  | 100 | 100 |  |  |
| Production Example E |  |  |  |  |  |  |  |  |  |
| Production Example F |  | 30 | 20 | 10 |  |  | 5 | 70 |  |
| Production Example G |  |  |  |  | 10 |  |  |  |  |
| Production Example H |  |  |  |  |  |  |  | 70 |  |
| Unsaturated modified polyolefin/urethane prepolymer |  | 66/44 | 78/22 | 85/15 | 85/15 | 87/13 | 57/43 | 45/55 | 100/0 |
| Volatile oil resistance |  | o | o | o | o | o | o | o | o |
| Gasoline resistance |  | o | o | o | o | o | o | o | o |
| Storage stability at low temperature |  | o | o | Δ | Δ | Δ | o | o | x |
| Smell |  | o | o | o | o | x | x | o | o |
| Adhesion to Typical Materials | dull plate (iron) | o | o | o | o | o | o | o | o |
|  | aluminum | o | o | o | o | o | x | x | o |
|  | stainless | o | o | o | o | o | o | x | o |

TABLE III-continued

| | | | | | | | | |
|---|---|---|---|---|---|---|---|---|
| steel | | | | | | | | |
| polypropylene | o | o | o | o | o | o | o | o |
| SMC | o | o | o | o | o | o | o | o |
| PBT | o | o | o | o | o | o | o | o |
| nylon | o | o | o | o | o | o | o | o |

| | Comparative Example 2 | Comparative Example 3 | Test Methods | Evaluation Methods |
|---|---|---|---|---|
| Production Example A | | | | |
| Production Example B | | | | |
| Production Example C | | | | |
| Production Example D | | | | |
| Production Example E | 100 | | | |
| Production Example F | | 100 | | |
| Production Example G | | | | |
| Production Example H | | | | |
| Unsaturated modified polyolefin/urethane prepolymer | 100/0 | 0/100 | | |
| Volatile oil resistance | o | x | JISK5400.7.7 | no change after 5 hours at 20° C. |
| Gasoline resistance | o | x | immersion in gasoline having high octane value | no change after 5 hours at 20° C. |
| Storage stability at low temperature | x | o | stored at −25° C. for 1 month | not solidified |
| Smell | x | o | smell at 80° C. | not stimulative to mucosa |
| Adhesion to Typical Materials — dull plate (iron) | o | x | | |
| aluminum | o | x | 40° C. × 240 hours after immersion in warm water | not peeled |
| stainless steel | o | x | | |
| polypropylene | o | x | JISK5400.6.15 | |
| SMC | o | x | | |
| PBT | o | x | | |
| nylon | o | x | | |

Solvent Resistance Test Results of Coating Compositions of Examples and Comparative Examples The solvent resistance test was carried out according to the method shown in Table III and the test was conducted until the critical value was obtained. The obtained results are shown in Table IV. From these results, it is seen that the coating resin composition of the present invention has a remarkably superior gasoline resistance to the modified chlorinated polyolefin (Comparative Example 2) and the esterification product thereof (Comparative Example 1). Therefore, the coating resin composition of the present invention is superior.

TABLE IV

| | Volatile Oil Resistance | Gasoline Resistance |
|---|---|---|
| Example 1 | more than 24 hours | more than 24 hours |
| Example 2 | more than 24 hours | more than 24 hours |
| Comparative Example 1 | more than 24 hours | 16 hours |
| Comparative Example 2 | more than 24 hours | 16 hours |

We claim:

1. A paint comprising a solution of resin composition in an organic solvent, said resin composition comprising a mixture of (A) a composition comprising a graft polymer of chlorinated polyolefin and an esterified unsaturated carboxylic acid plus residual esterified unsaturated carboxylic acid that is not grafted to said chlorinated polyolefin, and (B) a polyurethane polyol, which is a copolymer of ($b_1$) an isocyanate monomer having an isocyanate functionality of 2, and ($b_2$) a polyol, said polyurethane polyol (B) being formed form said isocyanate monomer ($b_1$) and said polyol ($b_2$) provided at an equivalent NCO/OH range of between about 0.1 and about 0.7, said polyurethane polyol (B) being stably soluble in toluene when stored at −25° C. for 1 month.

2. A paint as set forth in claim 1, wherein the chlorination degree of the chlorinated polyolefin is 10 to 50%.

3. A paint as set forth in claim 1, wherein the weight ratio of the solids of composition (A) to the solids of said polyurethane polyol (B) is in the range of from 10/90 to 90/10.

4. A paint as set forth in claim 1, wherein the chlorinated polyolefin is a chlorination product of a polyolefin selected from the group consisting of homopolymers and copolymers of ethylene, propylene, 1-butene and 3-methyl-1-butene.

5. A paint as set forth in claim 1, wherein the unsaturated carboxylic acid has up to 15 carbon atoms and at least one double bond.

6. A paint as set forth in claim 1, wherein the unsaturated carboxylic acid is an unsaturated carboxylic acid selected from the group consisting of dibasic carboxylic acids and anhydrides thereof.

7. A paint comprising a solution of resin composition in an organic solvent, said resin composition comprising a mixture of (A) a composition comprising a graft polymer of chlorinated polyolefin and an esterified unsaturated carboxylic acid plus residual esterified unsaturated carboxylic acid that is not grafted to said chlorinated polyolefin, and (B) a polyurethane polyol, which is a copolymer of ($b_1$) and isocyanate monomer having an isocyanate functionality of 2, and (b$_2$) a polyol selected from the group consisting of OH-containing polyisoprene and polytetramethylene glycol, said polyurethane polyol (B) being formed from said isocyanate monomer (b$_1$) and said polyol (b$_2$) provided at an equivalent NCO/OH range of between about 0.1 and about 0.7.

8. A paint as set forth in claim 7, wherein the chlorination degree of the chlorinated polyolefin is 10 to 50%.

9. A paint as set forth in claim 7, wherein the weight ratio of the solids of composition (A) to the solids of said polyurethane polyol (B) is in the range of from 10/90 to 90/10.

10. A paint as set forth in claim 7, wherein the chlorinated polyolefin is a chlorination product of a polyolefin selected from the group consisting of homopolymers and copolymers of ethylene, propylene, 1-butene and 3-methyl-1-butene.

11. A paint as set forth in claim 7, wherein the unsaturated carboxylic acid has up to 15 carbon atoms and at least one double bond.

12. A paint as set forth in claim 7, wherein the unsaturated carboxylic acid is an unsaturated carboxylic acid selected from the group consisting of dibasic carboxylic acids and anhydrides thereof.

* * * * *